United States Patent [19]

Fein

[11] Patent Number: 5,243,465
[45] Date of Patent: Sep. 7, 1993

[54] AREA-DIVISION BEAMSPLITTER WITH BROAD SPECTRAL BANDWIDTH

[75] Inventor: Michael E. Fein, Mountain View, Calif.

[73] Assignee: Tencor Instruments, Mountain View, Calif.

[21] Appl. No.: 881,809

[22] Filed: May 12, 1992

[51] Int. Cl.⁵ ............................................. G02B 27/14
[52] U.S. Cl. ................................. 359/636; 359/634; 359/350
[58] Field of Search ............... 359/629, 636, 639, 640, 359/634, 350

[56] References Cited

U.S. PATENT DOCUMENTS

| | | | |
|---|---|---|---|
| 1,509,936 | 9/1924 | Douglass . | |
| 3,436,143 | 4/1969 | Garrett | 350/147 |
| 4,555,163 | 11/1985 | Wagner | 350/172 |
| 4,586,786 | 5/1986 | Suzuki et al. | 350/169 |
| 4,844,617 | 7/1989 | Kelderman et al. | 356/372 |
| 5,099,358 | 3/1992 | Okazaki | 359/618 |

OTHER PUBLICATIONS

Oriel Corporation "Polka Dot Beam Splitters", pp. 7-8 of catalog.

Oriel Corporation "Coarse Grating Beam Splitters", pp. 7-12 of catalog.

*Primary Examiner*—Edward K. Look
*Assistant Examiner*—F. David Lopez
*Attorney, Agent, or Firm*—Schneck & McHugh

[57] ABSTRACT

A broadband area-division beamsplitter that includes a pair of abutting triangular prisms providing two surfaces that are in optical contact in certain areas and are out of optical contact in other areas. One prism surface is substantially planar while adjoining surface of the other prism has alternating protrusions and depressions. The protrusions contact the substantially planar surface to form an optically continuous medium for light transmission. The depressions do not contact the planar surface forming gaps. The two surfaces are oriented on a diagonal so that light incident through one of the other prism faces is incident on the adjoining surfaces at an angle larger than the critical angle, providing total internal reflection at the out-of-contact gap regions. The protrusions and depressions on the one prism surface may be in the form of a corrugation or a checkerboard or some other patterns. The reticulation size of the pattern may be less than about 10 μm, so that light diffracted from the beamsplitter will fall outside of the apertures of optical systems in which the beamsplitter is used.

24 Claims, 3 Drawing Sheets

AREA-DIVISION BEAMSPLITTER WITH BROAD SPECTRAL BANDWIDTH

TECHNICAL FIELD

The present invention relates to optical beamsplitters of the area-division type, i.e., light dividing optical elements in which the different rays that are reflected or transmitted are distinguished by their spatial positions of incidence upon the beam dividing surface.

BACKGROUND ART

Beamsplitters are widely used components in many optical systems. For example, one possible use for a beamsplitter is in diffraction-limited optical imaging and measuring systems, such as the thin-film measuring microscope shown in FIG. 1. That microscope is seen to include a broadband light source 11, such as an arc lamp, which provides light that typically has a wavelength range of at least 250-1200 nm and which may extend from 200-2500 nm or beyond. A band-selecting filter 13, such as a reflective filter wheel, may be positioned in the light path to select a particular octave-wide band of interest within this available wavelength range (in order to avoid overlapping diffraction orders in the microscope's spectrometer 27). Typically, a spatial homogenizer 15 is also placed in the light path to eliminate any artifacts of the beam due to the illumination system. Next, the beamsplitter 17 that is of particular interest with regard to the present invention is placed so as to reflect a portion of the light beam through a microscope objective 19 to illuminate an area of the object or workpiece 21 to be viewed and measured. The light reflected or scattered from the workpiece 21 is gathered and focused by the microscope objective 19 onto a reflective field stop 23 having an aperture 25, the light being partially transmitted through the beamsplitter 17 on the way from the objective 19 to the stop 23. In this manner, the illuminated area of the workpiece 21 is imaged on the stop 23. Aperture 25, such as a small slit, may be the entrance to a spectrometer 27, as shown here, having a reflective concave diffraction grating 29 and a detector array 31 and a zero-order detector 36. Light not passing through aperture 25 is reflected by the field stop 23, which typically is oriented at a 45° angle to the optical axis of the system, and is then directed via relay lenses and mirror 33 to viewing optics, such as an eyepiece 35. An aperture stop 34 may be placed in the viewing system between relay lenses 33 to ensure against introducing artifacts into the image enroute to the eyepiece 35. Details of similar microscopes can be found in U.S. Pat. No. 4,844,617 to Kelderman et al., and many other publications.

The beamsplitter 17 in the above described example and beamsplitters in many other optical systems are required to have a large performance bandwidth, i.e. to have a nearly spectrally neutral response over a very broad spectral range. Beamsplitters for use in imaging systems should not introduce any artifacts of their own into the observed image. Further, beamsplitters should be both durable and insensitive to changes in humidity and other environmental factors. Low absorption is critical in those optical systems that need to make efficient use of the available light, such as in spectroscopic systems.

There are essentially two basic types of beamsplitter, namely wavefront-division beamsplitters and area-division beamsplitters, each with its own advantages over the other. Wavefront-division beamsplitters are the type generally preferred for use in imaging systems, because the uniform areawise response of their partially reflective, partially transmissive coatings give them the very fine resolution needed in such systems. However, it is very difficult to make broadband beamsplitters of this type that are low in absorption. Further, beamsplitter coatings made by conventional techniques are not both durable and spectroscopically stable for changes in environmental conditions. In particular, most all-dielectric optical coatings have a demonstrable change in performance as room humidity changes. By contrast, all-fluoride dielectric coatings may be insensitive to humidity, but are instead often somewhat fragile. Coatings that are made by using an ion-assisted deposition technique could be used to make coatings that are both humidity insensitive and durable, but it is unknown whether such coatings would work in both ultraviolet (to at least 254 nm) and visible regimes. Metal-dielectric hybrid coatings achieve broadband performance, but are relatively lossy, and hence less than optimal for use in spectroscopic optical systems and the like. Further, the dielectric materials used in the hybrid coatings are believed to present the same undesirable tradeoff between durability and humidity sensitivity as all-dielectric coatings.

Area-division beamsplitters are also well known For example, U.S. Pat. No. 4,586,786 to Suzuki et al. discloses a beamsplitter having a pattern of randomly arranged light reflecting and light transmitting portions, such as a plurality of aluminum squares or circles arranged on a glass surface. The arrangement is random in order to avoid degradation in the intensity distribution of a point image, due to diffraction if they were to be disposed periodically. However, the arrangement is chosen not to be so random that the irregularity or fluctuation in the quantity of light reaching a sensor surface would exceed 5%. The reflecting portions have a minimum size or width on the order of 1/100 to 1/10 of the distance along the optical axis from the beamsplitter to the image plane, and have a size which is typically equal to that over which a point imaging light beam of F/5.6 illuminates the beamsplitter surface.

The Oriel Corporation of Stratford, Conn., U.S.A. sells a "polka dot" beamsplitter, seen in FIG. 2, having a periodic pattern of 2.5 mm diameter aluminum dots 43, separated by a 3.2 mm center-to-center distance, coated on a flat UV-grade fused silica substrate 41 and covered by a protective silica overcoat. The beamsplitter has very broadband performance, with a response said to be neutral over a 250-2500 nm wavelength range. The reflectance spectrum is characteristic of the thick aluminum film with silica overcoat, while the transmittance spectrum is that of the silica substrate. The smallest beam diameter suitable for a 50% R / 50% T split is 9.5 mm. Oriel Corp. also sells a "coarse grating" beamsplitter consisting of a series of small mirror facets formed on the surface of a glass substrate, with symmetrical triangular profiles spaced at 4/mm. The substrate is coated with aluminum and a protective overcoat. Faceted surface geometries are available for splitting a normal incidence beam into two reflected beams at 45° to the incident beam (at right angles to each other) or at 60° to the incident beam. Again, the reflectance spectrum is that of the overcoated aluminum.

If a "polka dot" beamsplitter were used in the thin-film measuring microscope of FIG. 1, the pupil of the objective 19 would only be partially filled with light in a pattern corresponding to the dots on the beamsplitter. This would necessarily modify the image produced on the reflective stop 23 by the objective 19. The efficiency of the beamsplitter would be hard to predict, because the RT product would depend on how the images of the polka dots, in reflection, lined up with the polka dots themselves. In its sales brochures, Oriel Corp. cautions potential buyers that these beamsplitters should not be used near any focal plane of an imaging system. Likewise, for its "coarse grating" beamsplitters, Oriel Corp. states that since the grating does not function as a continuous surface beamsplitter, it is not recommended for imaging systems.

In U.S. Pat. No. 1,509,936, Douglass describes a light transmitting and reflecting device positioned behind a camera lens for producing duplicate images of an object on two separate sheets of photographic film. Two large-angle prisms are placed together so that their large faces are mutually engaged. The prisms are provided along their large faces with a plurality of parallel, equidistant, triangular cuts or depressions, with the depressions separated from each other by a plurality of parallel light-reflecting surfaces located between the depressions. The prisms, when mutually engaged, form a cube having diagonally therein a series of alternating square gaps and reflecting surfaces, with the gaps corresponding to matching cuts on the large faces providing areas through which light rays may be transmitted. The engaged surfaces between the transmissive gaps require a reflective material coating to effect the light reflection. Accordingly, the reflective spectrum will match that of whatever coating material is used.

It is an object of the invention to provide a broadband area-division beamsplitter suitable for use in diffraction-limited imaging systems.

It is another object of the invention to provide a broadband area-division beamsplitter which is both durable and insensitive to room humidity and other environmental changes, and which has a neutral reflectance response that does not depend upon the reflectance of a coating material.

DISCLOSURE OF THE INVENTION

The above objects have been met with an area-division beamsplitter that makes use of total internal reflection (TIR) and therefore does not require any bandwidth limiting dielectric coatings or reflective metal films to divide a beam into plural paths. In general, the beamsplitter includes two mating transparent material surfaces that are oriented for light incidence at an angle larger than a critical angle for TIR, and that are made such that certain areas of the two surfaces are in optical contact so as to be transmissive to the incident light and other areas of the two surfaces are out of optical contact so as to form gaps that are totally reflective of the light incident upon one of the surfaces in these out-of-contact areas.

In a particular embodiment of the invention, the beamsplitter comprises a pair of contiguous prisms, one prism having a patterned surface of alternating protrusions and depressions and the other prism having a smooth surface. The prisms are abutted such that the protrusions on the one prism and the smooth surface on the other prism contact one another to form an optically continuous medium through which light may be transmitted. The depressions in the one prism surface are spaced apart from the smooth surface of the other prism to create a pattern of prism-air interfaces within the pair of abutting prisms at which light may be totally reflected. Thus, the overall interface between the prisms consists of alternate prism-to-prism and prism-to-air segments, effecting transmission and reflection, respectively.

This and other area-division beamsplitters can be made to appear optically indistinguishable from uniform wavefront-division beamsplitters, and, if so made, can be used in diffraction-limited optical systems. In particular, the reticulation size, that is, the center-to-center spacing d between nearest protrusions or between nearest depressions of the pattern, should be small enough that light diffracted from the pattern is placed outside the system aperture. This means that the spacing of protrusions and depressions must be close enough that the first order diffracted light (and thus all higher diffraction orders as well) falls outside the apertures of the objective lens, diffraction grating, etc. in the optical system. This will occur in the thin-film measuring microscope of FIG. 1, for example, if the center-to-center spacing d for the beamsplitter pattern is not greater than $\lambda/2 \cdot NA$, where $\lambda$ is the minimum wavelength of interest and NA is the backside numerical aperture of the microscope objective. Typically, the spacing between nearest protrusions or nearest depressions will be at most 10 $\mu m$, and in many cases will be much smaller. Such fine spacing can be made by patterned etching of the prism surface with photolithographic techniques.

Advantages of the coating-free construction include environmental stability, broad spectral bandwidth and negligible absorptive loss.

BEST MODE OF CARRYING OUT THE INVENTION

Figure 3:
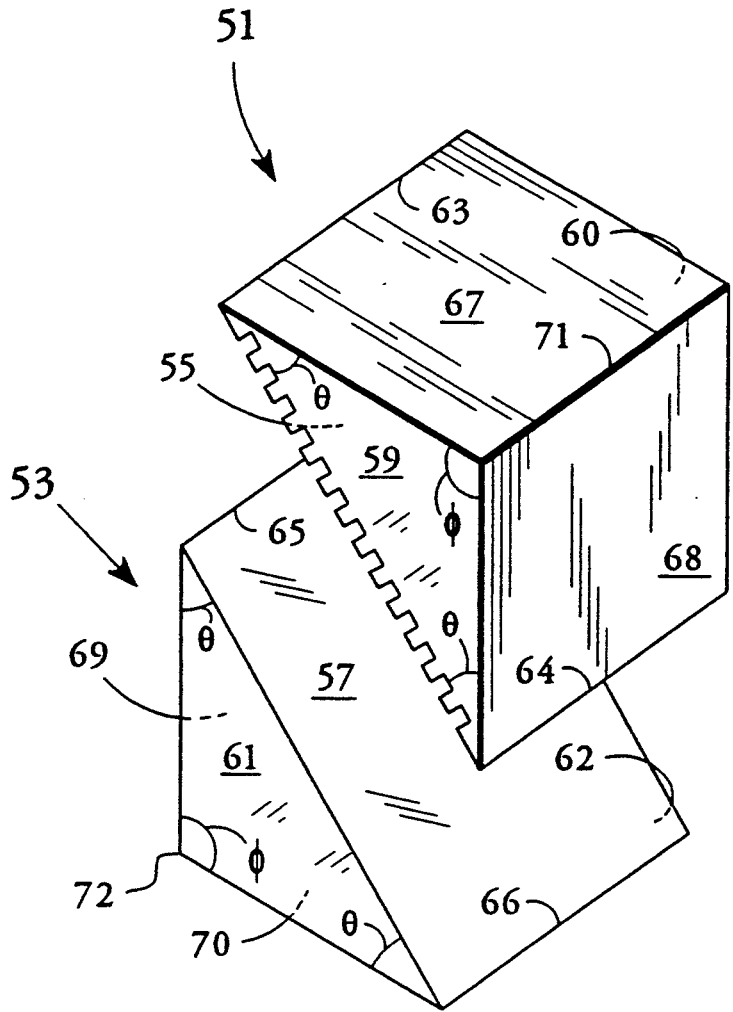
FIG. 3 is a perspective exploded view of a beamsplitter of the present invention.

With reference to FIG. 3, a beamsplitter of the present invention, shown separated into its composite pieces, is made up of two congruent isosceles triangular prisms 51 and 53 composed of a transparent material. Typical prism materials are UV-transmissive glass, fused silica, quartz and fluorite. The material should be transparent over a wavelength range of at least 250–1200 nm, and preferably over a wavelength range of 200–2500 nm, or even 180–3000 nm or beyond, depending on the wavelengths of interest. Each prism 51 and 53 has a coating-free principal face 55 and 57, respectively, extending between a pair of opposed isosceles triangular bases 59–62 and bounded by a pair of edges 63–66 characterized by equal angles Θ. Each prism also has a pair of secondary faces 67–70 extending between the pair of opposed prism bases 59–62 with each secondary face 67-70 bounded by a pair of edges 63 and 71, 64 and 71, 65 and 72, and 66 and 72, characterized by usually unequal angles Θ and φ.

Figure 6:
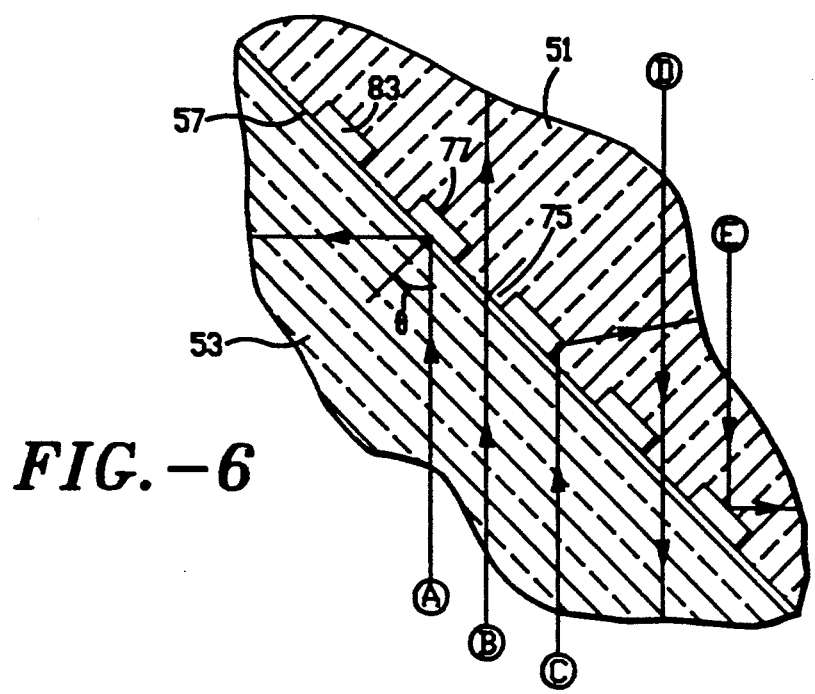
FIG. 6 is an enlarged side sectional view of a portion of an assembled beamsplitter of the present invention.

The principal faces 55 and 57 of the pair of prisms 51 and 53 are abutted, as seen in part in FIG. 6, so that they mutually engage one another from base 59 and 61 to base 60 and 62 and from edge 63 and 65 to edge 64 and 66 to form a parallelogram-based prism. When so abutted, the principal faces 57 and 59 together form a diagonal from combined edge 63 and 65 to combined edge 64 and 66 through the parallelogram-based prism. The pair of prisms 51 and 53 may be rigidly held together in mutually engaged relation by edge seals, not shown, extending along the combined edges 63 and 65 from base 59 and 61 to base 60 and 62, and likewise along the combined edges 64 and 66 from base 59 and 61 to base 60 and 62. The long diagonal edges may also be sealed. These edge seals may be a string or ribbon of adhesive applied to the combined edges, or an adhesive tape or web adhered to the secondary faces 67 and 69 over combined edge 63 and 65, and likewise adhered to the secondary faces 68 and 70 over combined edge 64 and 66. The central areas of the secondary faces 67-70 away from the combined edges should remain free of edge seal material so that light may pass unimpeded through these central areas.

Figure 4:
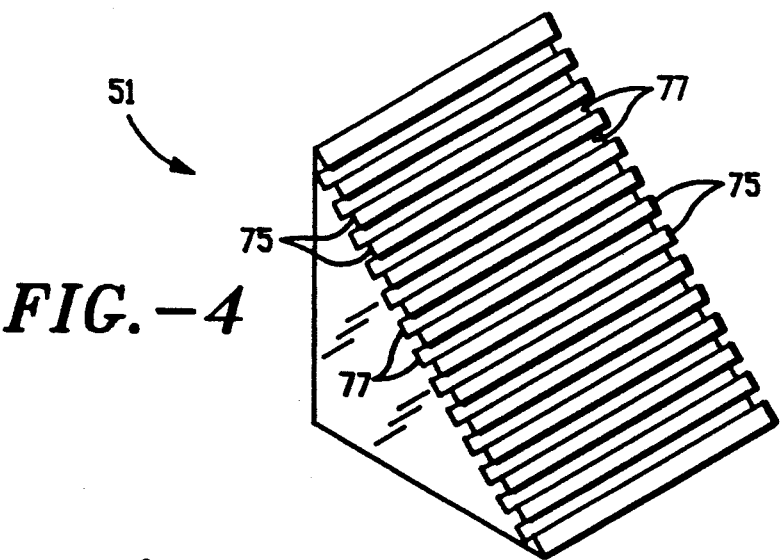
FIGS. 4 and 5 are perspective views of alternate embodiments of one prism component of the beamsplitter of FIG. 3.
Figure 5:
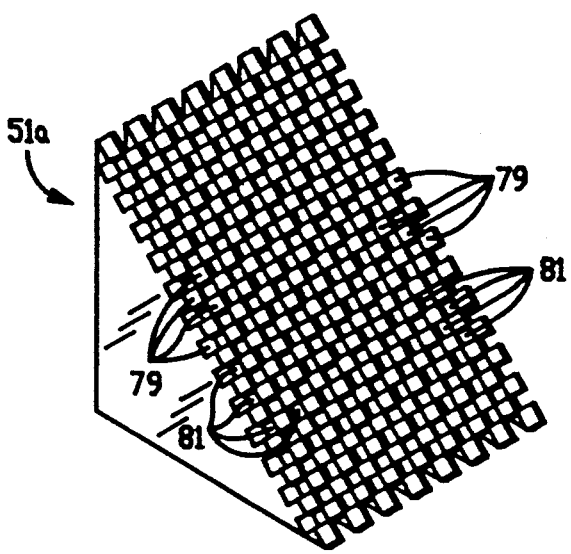

The principal face 57 of triangular prism 53 is substantially planar. The principal face 55 of triangular prism 51 has a patterned surface of raised and depressed portions. FIGS. 4 and 5 show two such patterns. In FIG. 4, the principal face of prism 51 has a patterned surface made up of elongate, spaced apart, flat linear ridges or mesas 75 and elongate, spaced apart, flat linear channels 77. The ridges 75 and channels 77 alternate to form a kind of corrugation. The tops of the ridges or mesas 75 should be flat and lie in a common plane so that they may intimately engage the substantially planar principal face 57 of the other prism 53 in FIG. 3. Preferably, the bottoms of the channels 77 are also flat and lie in a plane so that lightwaves incident on these channel bottoms from prism 51 will reflect from an optically flat surface. However, the shape or flatness of the channel bottoms will not be critical if light rays will only be incident through prism 53 onto planar surface 57.

In FIG. 5, an alternate prism 51a has a principal face with a patterned surface made up of a plurality of box-shaped mounds 79 and pits 81 forming a checkerboard-like pattern of rows and columns of such mounds 79 and pits 81. The mounds 79 and pits 81 alternate in the rows of the checkerboard-like pattern and also alternate in the columns of the checkerboard-like pattern, so that mounds 79 and pits 81 are respectively situated in alternating diagonals of the pattern. As with the ridges 75 and channels 77 in FIG. 4, the tops of the mounds 79 should be flat squares that lie in a common plane so that they may intimately engage the substantially planar principal face 57 of the other prism 53, and the bottoms of the pits are preferably also flat squares that lie in a plane for providing an optically flat surface for reflection of light incident thereupon from the prism 51a. Other patterns of alternating raised areas or protrusions and depressed areas or depressions, other than those shown in FIGS. 4 and 5, can also be used.

With reference to FIG. 6, when the prisms 51 and 53 are abutted, the raised portions or protrusions of the triangular prism 51, such as ridges or mesas 75, intimately engage the substantially planar surface 57 of the triangular prism 53 in an optically continuous interface. Light rays B and D incident on this optically continuous interface at areas where these protrusions 75 are located (and remote from ridge/channel boundary edges) are clearly transmitted through the interface. The light can be incident from either prism 51 or 53 and will pass through the optically continuous interface into the other prism 53 or 51.

The depressed portions or depressions in the triangular prism 51, such as channels 77, must be of sufficient depth to substantially suppress transmissive evanescent-wave coupling across the gaps 83 formed between the bottoms of the depressions 77 and the planar principal face 57 of the prism 53. It will usually suffice to make the depressions 77 at least one wavelength deeper than the raised portions 75 at the longest wavelength to be processed by the optical system (e.g., about 2.5 μm deep). Preferably, the depressed portions are significantly deeper than one wavelength. A depth of from 5 to 10 μm is typical, depending in part on the reticulation size of the surface pattern. Thus, optically discontinuous gaps 83 are formed on the diagonal of the parallelogram-based combined prism between the bottoms of the depressions 77 of triangular prism 51 and the substantially planar principal face 57 of the triangular prism 53. Light rays A and E incident on these optically discontinuous gaps 83 at an angle Θ greater than the critical angle $Θ_c$ will be totally internally reflected at an equal angle Θ relative to the normal to the planar surface 57 or 77. Again, the light can be incident from either prism 51 or 53. Light rays A incident from prism 53 upon the planar principal surface 57 of prism 53 at the locations of the gaps 83 will be clearly reflected by the prism-air interface at surface 57, and will remain in prism 53. Light rays E incident from prism 51 upon the bottoms of the channels 77 will likewise be clearly reflected by the prism-air interface, provided these channel bottoms are optically flat and lie in a common plane. The reflected light rays of light E will remain in prism 51.

Referring to both FIGS. 3 and 6, the beamsplitter will operate properly only when light reflects off of the prism-air interface provided by gaps 83 at the locations of depressions 77. In order to ensure total internal reflection, the light rays A and E must be incident upon the interfaces at gaps 83 at an angle Θ which is at least the critical angle $Θ_c$ for all wavelengths in the range of interest. Accordingly, the critical angle $Θ_c$ for the beamsplitter is defined as:

$$Θ_c = \arcsin(1/n_{min}),$$

where $n_{min}$ is the minimum refractive index in a selected range of wavelengths λ of the prism material, and where the prism material is characterized by a refractive index n(λ). Making the incidence angle Θ greater than this defined beamsplitter critical angle $Θ_c$ will ensure total internal reflection for all wavelengths λ within the selected range. Typically, the incoming light is first incident upon a secondary face 67-70 of the prism structure, preferably perpendicular to this secondary face 67-70. Passing into the prism structure through this face 67-70 (and being refracted in the process, if the light is not perpendicularly incident on the secondary face 67-70), the light reaches the interface where areawise transmission and reflection takes place. If the equal angle edges 63-66 of the triangular prisms 51 and 53 are characterized by an angle Θ, then normal incidence upon a secondary face 67-70 will result in incidence on the beamsplitting interface being at the same angle Θ. Accordingly, prism edges 63–67 of the isosceles triangular prisms 51 and 53 are preferably made at an angle Θ that is at least the beamsplitter critical angle $Θ_c$ defined by the equation set forth above, because normal incidence on a secondary face 67–70 will then ensure total internal reflection at all wavelengths of interest. Prisms 51 and 53 are typically 45°–45°–90°-based prisms.

The beamsplitter of the present invention requires no reflection coatings at the beamsplitting interface, and so is immune from environmental changes that affect coated beamsplitters. Besides being durable, it works over a spectral bandwidth that is equal to that of the prism medium. Also, because total internal reflection is used, the beamsplitter is nonpolarizing. The efficiency is limited only by diffraction losses and by the shadowing that occurs at edges of the depressions 77. Note that in FIG. 6, a light ray C that strikes a channel-ridge boundary is scattered out of the main optical path in a direction that corresponds neither to the transmitted rays B and D nor to the reflected rays A and E.

Strong light that may be reflected from surfaces other than the beamsplitting surface 57 or 77 can be reduced or eliminated by a number of techniques. Tilted surfaces may be used to deflect second-surface reflections out of the optical system. The entrance and exit surfaces 67–70 may be made Brewster-angle surfaces, in cases where polarization is tolerable or even desirable, to replace perpendicular incidence entrance and exit surfaces. Single-layer AR coatings, e.g. of $MgF_2$ have moderately good performance over a wide spectral range. Graded-density $SiO_2$ coatings could also be used in cases where fragility is tolerable.

Referring again to FIG. 1, the beamsplitter of the present invention can be used for the beamsplitter 17 in the thin-film measuring microscope shown and in other diffraction-limited optical systems, provided the reticulation size of the patterned beamsplitting surface is chosen such that the first-order (and higher orders) diffraction beam produced by the beamsplitter, considered temporarily as a diffraction grating, is deflected outside the aperture of the microscope objective 19. Because the only optical information about the beamsplitter's reticulation is contained in the light that diffracts entirely outside the objective 19, the objective 19 responds exactly as though it were illuminated by a uniform wavefront from a wavefront-division beamsplitter, with no discernible difference in the resulting image. The reticulation effectively becomes invisible to the optical system, and to a useful approximation, the area-division beamsplitter of the present invention is then optically indistinguishable from a uniform wavefront-division beamsplitter.

Figure 1:
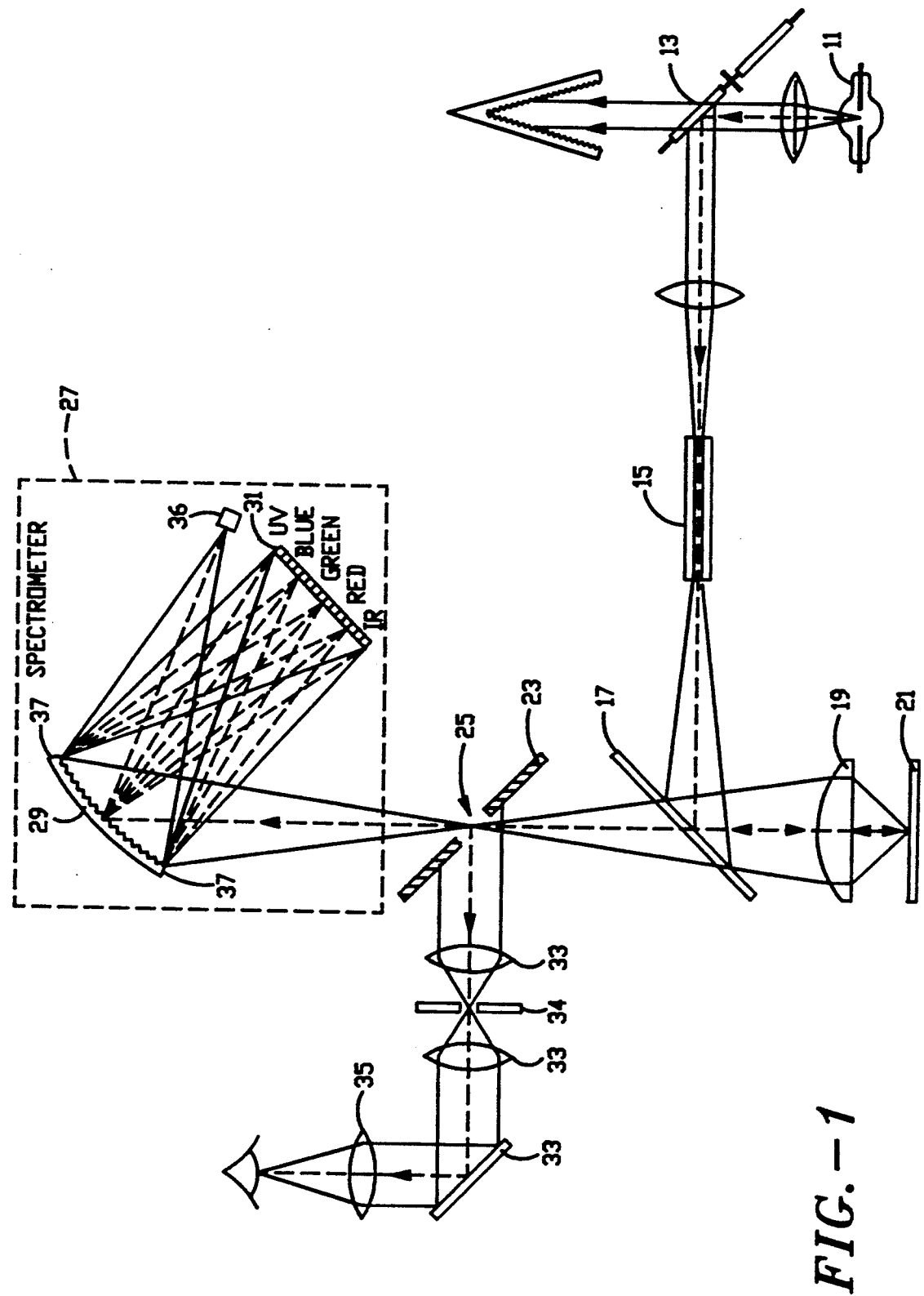
FIG. 1 is a side elevational view of a thin-film measuring microscope for employing a beamsplitter of the present invention.
Figure 2:
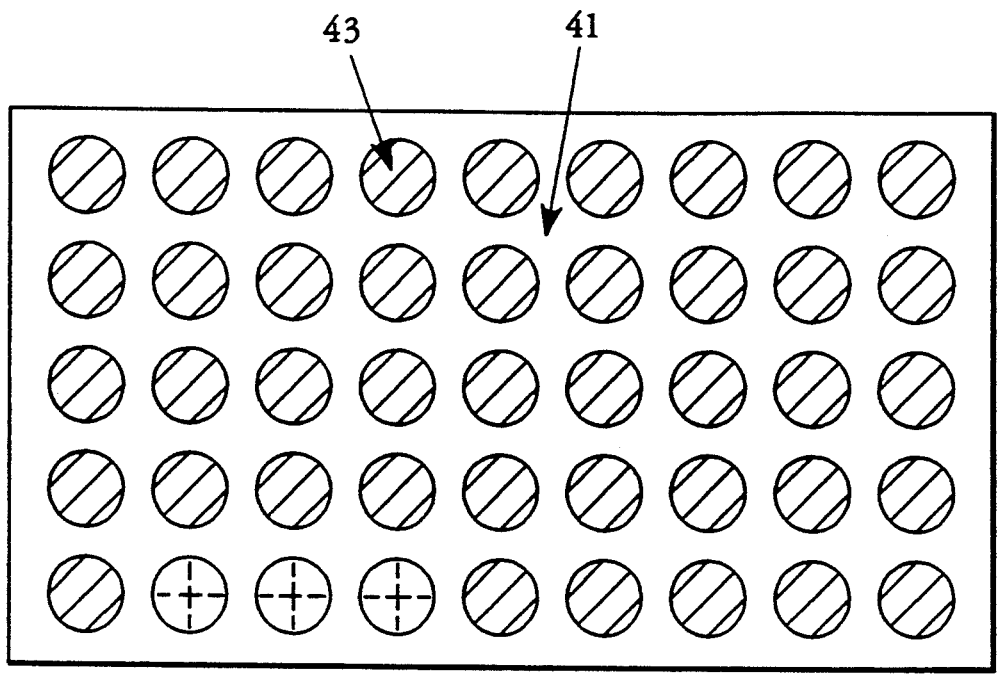
FIG. 2 is a top plan view of an area-division beamsplitter of the prior art.

The diffraction-limited optical system of FIG. 1 has aperture stop 34 that transmits only light rays that are within an angular zone up to a maximum angle from the optical axis of the system enroute to the viewing optics 35. Similarly, the periphery 37 of grating 29 acts as an aperture stop for rays that will reach detector array 31 or zero-order detector 36. This angular zone is characterized by a numerical aperture NA. Rays diffracted outside the system aperture, such as by the beamsplitter reticulation, are blocked or obstructed by the aperture stops 23 and 37. In this way, stray light outside the angular zone is prevented from contributing to the image and no artifacts are seen. If the aperture stops 23 and 37 are sized to match the back numerical aperture of the objective 19, no optical information will be lost from the beam.

For the simple case of a telecentric objective 19, with the beamsplitter 17 close to the image plane, the center-to-center spacing d between nearest depressions or between nearest protrusions in the patterned beamsplitting surface should be chosen such that $$d < \lambda/2 \cdot (NA),$$

where $\lambda$ is the minimum wavelength of interest and NA is the back numerical aperture of the microscope objective 19. This is simply Abbe's criterion for the resolution of a microscope, applied to the low numerical aperture back side rather than the usual front side of the objective 19. The back side is the same side as of the objective 19 as the beamsplitter 17 whose reticulation we do not wish the system to resolve.

For example, if the objective 19 has a numerical aperture of 0.5 on the front side and a magnification of 40X, then the backside numerical aperture would be 0.5/40 = 0.0125. If the minimum wavelength to be processed by the optical system is 250 nm, then the reticulation size d should be less than 250 nm / 2·(0.0125) = 10 μm. The center-to-center spacing between nearest protrusions or nearest depressions in the patterned surface 55 on the prism 51 in FIGS. 3–5 should be at most 10 μm. If the microscope objective 19 instead has a magnification of say 36X and the minimum wavelength to be processed by the optical system is 180 nm, then the backside numerical aperture NA becomes 0.01389 and the maximum reticulation size d becomes 6.48 μm.

For a nontelecentric objective 19 or for a beamsplitter 17 some distance away from the image plane, a greater diffraction angle and hence a finer reticulation would be required. Such fine reticulation sizes can be readily achieved in the beamsplitter structure of the present invention using photolithographic techniques to etch the pattern into the prism surface. Because of the low numerical aperture of the back side of a microscope objective, the required diffraction angle can be achieved with a reticulation size that is substantially greater than one wavelength of light (typically, up to 2.5 μm wavelengths are of interest). The diffraction efficiency of the "grating" is hence relatively low, little light is lost by the optical system from diffraction, and thus the beamsplitter remains efficient. An RT product for the beamsplitter 17 in the system of FIG. 1 is close to the theoretically perfect 25% for beamsplitters of the present invention. The lower the numerical aperture at the point where the beamsplitter 17 is inserted into the system, the better this works. In some cases, it may be desirable to introduce additional optical elements into the system to further reduce the numerical aperture at the plane of the beamsplitter 17 (and correspondingly increase the beam area at the plane of the beamsplitter), and therefore to permit coarser beamsplitter reticulations to be used or to widen the bandwidth of the beamsplitter into even shorter wavelengths of light for a given reticulation size.

Any area-division beamsplitter satisfying the above-described reticulation requirement for a given optical system can be used in that optical system in place of wavefront-division beamsplitters. That is, any area-division beamsplitter, having a beam dividing surface with a pattern of spatially distinct light transmitting and light reflecting portions, where the pattern is characterized by a reticulation size sufficiently small that first and higher order diffracted light from the beamsplitter is blocked by an aperture stop of the system, and thus prevented from contributing to the optical image, can be used. Such beamsplitters can include those whose light reflecting portions are single-layer or multilayer thin-film coatings, single-layer or multilayer metallic coatings, single-layer or multilayer dielectric coatings, or hybrid metal-dielectric coatings. While the totally internally reflecting embodiment described above with respect to FIGS. 3–6 is preferred in most systems, the coated beamsplitter versions may have technical advantages in some optical systems. For example, in systems where the shadowing effects of light rays C in FIG. 6 need to be minimized, some of the coated beamsplitter versions may be preferred, because they can sometimes be effective with coating thicknesses that are significantly less than a wavelength, and therefore can produce less shadowing than the totally internally reflecting embodiment.

I claim:

1. A beamsplitter comprising
a pair of prisms, one of said prisms having a patterned surface of alternating protrusions and depressions, the other of said prisms having a smooth surface, said prisms being abutted such that said protrusions of said one prism and said smooth surface of said other prism contact one another to form an optically continuous medium through which light may be transmitted, said depressions of said one prism being spaced apart from said smooth surface of said other prism to create a pattern of prism-air interfaces within said pair of abutting prisms at which interfaces light may be totally reflected.

2. The beamsplitter of claim 1 wherein said prism is composed of material that is transparent over a wavelength range of at least 250–1200 nm.

3. The beamsplitter of claim 2 wherein said prism material is selected from the group consisting of fused silica, UV-transmissive glass, quartz and fluorite.

4. The beamsplitter of claim 1 wherein a center-to-center spacing between nearest depressions and between nearest protrusions in said patterned surface is at most 10 μm.

5. The beamsplitter of claim 1 wherein said patterned surface of alternating protrusions and depressions comprises a corrugation of alternating elongate ridge mesas and channels.

6. The beamsplitter of claim 1 wherein said patterned surface of alternating protrusions and depressions comprises a checkerboard-like pattern of rows and columns with box-shaped mounds and pits being respectively situated in alternating diagonals of said pattern.

7. An area-division beamsplitter comprising
a congruent pair of isosceles triangular prisms composed of a transparent material of refractive index n ($\lambda$), each prism having a coating-free principal face extending between a pair of opposed isosceles triangular prism bases and bounded by a pair of edges characterized by equal angles $\Theta$, each prism also having a pair of secondary faces extending between said pair of opposed prism bases, each secondary face bounded by a pair of edges characterized by unequal angles $\Theta$ and $\phi$, said principal faces of said pair of prisms mutually engaging from base to base and from edge to edge to form a parallelogram-based prism with said principal faces together forming a diagonal from edge to edge through said parallelogram-based prism,
wherein said principal face of one of said triangular prisms forming said parallelogram-based prism is substantially planar, while said principal face of the other one of said triangular prisms has a patterned surface of raised and depressed portions, said raised portions of said patterned surface lying in a plane so as to intimately engage said substantially planar principal face of the other triangular prism in an optically continuous interface, said depressed portions of said patterned surface being deeper than said raised portions so that optically discontinuous gaps are formed on said diagonal between said depressed portions of said patterned surface and the substantially planar principal face of the other triangular prism, said depressed portions having a depth sufficient to substantially suppress transmissive evanescent-wave coupling across said gaps, and wherein said equal angles $\Theta$ characterizing said pair of edges bounding said principal face of each isosceles triangular prism are at least a critical angle $\Theta_c$ for total reflection at said optical discontinuous gaps on said diagonal of all light in a selected range of wavelengths $\lambda$ which is incident normal to one of said secondary faces and incident upon said diagonal at said angle $\Theta$, said critical angle $\Theta_c = \arcsin 1/n_{min}$, where $n_{min}$ is the minimum of n ($\lambda$) in said selected range of wavelengths $\lambda$.

8. The beamsplitter of claim 7 wherein said isosceles triangular prisms are based upon a 45°–45°–90° triangle, said pair of edges bounding said principal face of each prism characterized by equal 45° angles.

9. The beamsplitter of claim 7 wherein said pair of prisms are held together in mutually engaged relation by an edge seal extending along said equal angle edges from base-to-base.

10. The beamsplitter of claim 7 wherein said patterned surface is made up of alternating raised flat linear ridges and depressed flat linear channels.

11. The beamsplitter of claim 7 wherein said patterned surface forms a checkerboard of alternating raised and depressed flat squares.

12. The beamsplitter of claim 7 wherein each of said raised and depressed portions of said patterned surface has a size less than about 10 μm.

13. The beamsplitter of claim 7 wherein said depressed portions of said patterned surface are at least one wavelength deeper than said raised portions for all light in said selected range of wavelengths $\lambda$.

14. An optical system comprising
means, placed in a light path, for forming an optical image,
aperture means, placed in said light path, for allowing transmission of light rays within an angular zone up to a maximum angle from an optical axis associated with said light path and for blocking light rays outside of said angular zone, said angular zone defining a numerical aperture (NA) of the system, and
an area-division beamsplitter, placed in said light path, having a beam dividing surface with a pattern of spatially distinct light transmitting and light reflecting portions thereof,
wherein said pattern is characterized by a reticulation size sufficiently small that first and higher order diffracted light from said beamsplitter is blocked by said aperture means and prevented from contributing to said optical image, said image thereby being free of any artifacts due to said beamsplitter pattern.

15. The optical system of claim 14 wherein said pattern is characterized by a reticulation size $d < \lambda/ 2 \cdot NA$, where $\lambda$ is a minimum wavelength of said light rays.

16. The optical system of claim 14 wherein said light reflecting portions of said area-division beamsplitter are totally reflective at all wavelengths of said light rays.

17. The optical system of claim 16 wherein said area-division beamsplitter includes two mating transparent material surfaces having first areas where the two surfaces are in optical contact and second areas where the two surfaces are out of optical contact to form gaps at said second areas, said two mating transparent material surfaces being oriented with respect to said light path at an angle larger than a critical angle for total internal reflection of light rays at said second areas.

18. The optical system of claim 14 wherein said light reflecting portions of said area-division beamsplitter are thin-film coatings.

19. The optical system of claim 14 wherein said light reflecting portions of said area-division beamsplitter are metallic coatings.

20. The optical system of claim 14 wherein said light reflecting portions of said area-division beamsplitter are dielectric coatings.

21. The optical system of claim 14 wherein said light reflecting portions of said area-division beamsplitter are hybrid metal-dielectric coatings.

22. The optical system of claim 14 wherein said light reflecting portions of said area-division beamsplitter are single-layer reflective material coatings.

23. The optical system of claim 14 wherein said light reflecting portions of said area-division beamsplitter are multilayer coatings.

24. The optical system of claim 14 wherein said image forming means includes an objective lens.

* * * * *